Dec. 7, 1965     M. DVORIN     3,222,001
ROTOR ASSEMBLY
Filed Oct. 1, 1963
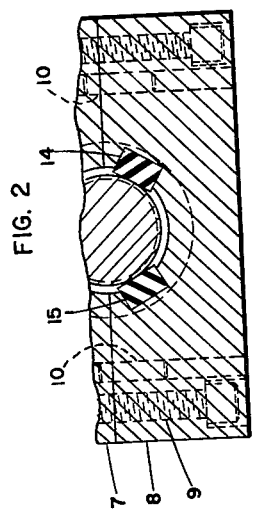
FIG. 2
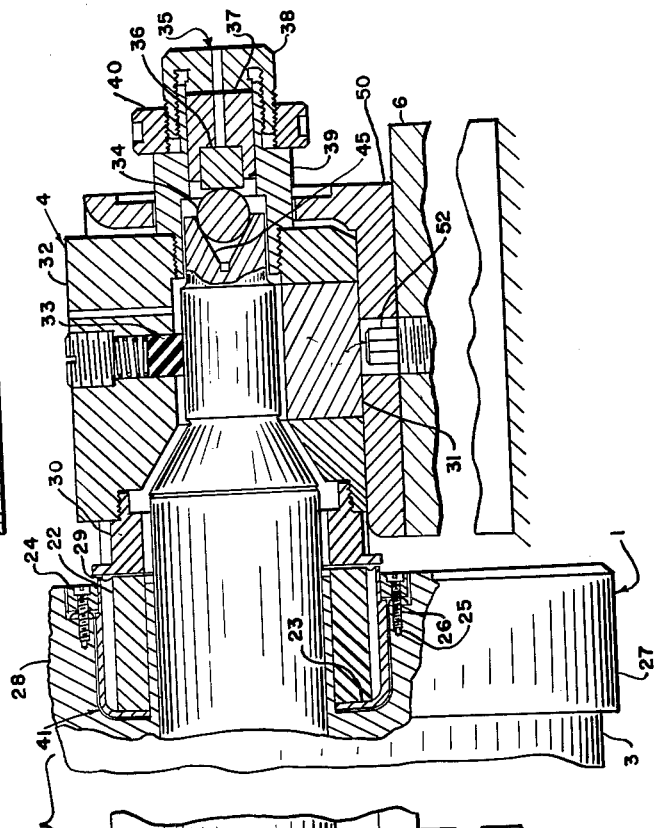
FIG. 1
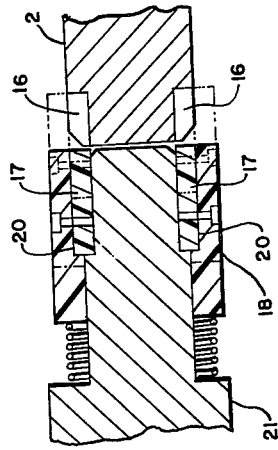
FIG. 3
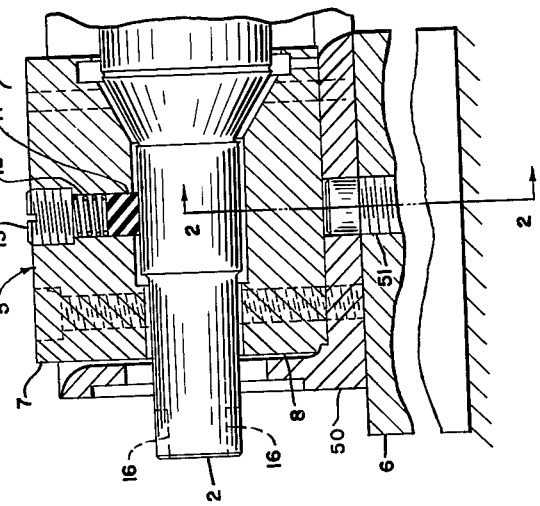
MARTIN DVORIN
INVENTOR.
BY
ATTORNEYS

United States Patent Office 3,222,001
Patented Dec. 7, 1965

3,222,001
ROTOR ASSEMBLY
Martin Dvorin, Brighton, N.Y., assignor to Bausch & Lomb Incorporated, Rochester, N.Y., a corporation of New York
Filed Oct. 1, 1963, Ser. No. 313,018
5 Claims. (Cl. 242—18)

This invention relates to a rotor and more particularly to an interchangeable rotor having predetermined dimensional and thrust characteristics.

The construction of an interchangeable rotor unit has use in a variety of situations one of these being the winding of a continuous fiber of glass. Due to the extremely small diameter of the fiber the rotor itself must be accurately balanced and spin true on its axis to reduce vibration and improve fiber control during the winding operation.

Accordingly this invention provides an interchangeable rotor unit which can be changed with ease but will maintain the same dimensional relationship to the frame supporting the rotor unit regardless of the rotor unit used. This is accomplished through an adjustable thrust bearing and a magnetic circuit applying the desired axial thrust to reduce the vibrations to a minimum and to maintain dimensions identical for any rotor.

It is an object of this invention to provide an interchangeable rotor with a controlled axial dimension relative to a rotor support.

It is another object of this invention to provide an interchangeable rotor utilizing a magnetic biasing force to maintain a uniform thrust, and having a controlled axial dimension of the rotor relative to the rotor mount.

It is a further object of this invention to provide an interchangeable rotor having an adjustable thrust bearing and a variable magnetic end thrust to maintain a predetermined dimensional tolerance of the rotor relative to the frame.

The objects of this invention are accomplished by the use of a rotor supported on a two-point bearing insert and retained by a spring biased bearing insert contained in a bearing housing. The end thrust is controlled through an adjustable thrust bearing to maintain a predetermined axial dimension of the rotor unit relative to the rotor mount. The rotor mounts are carried in a yoke held by gravity or clamping devices, such as bolts and nuts on a round pin, and a diamond point pin. The end play of the shaft carrying the rotor is eliminated through the use of a magnetic circuit which has a variable air gap to control the thrust and eliminate the end play by maintaining uniform operating conditions.

The attached drawings and subsequent description illustrate the preferred embodiment of this invention.

FIG. 1 illustrates the rotor unit mounted in the rotor mounts on the frame.

FIG. 2 illustrates a cross section view taken on line 2—2 of FIG. 1.

FIG. 3 illustrates a resilient key adapted for engaging the prime mover and the end of the shaft on the rotor.

Referring to the drawings FIG. 1 is a cross section view of the rotor unit and the rotor mounts. The rotor 1 is carried on the shaft 2. A portion of the rotor 1 is broken away to permit better illustration of the elements of assembly. The peripheral surface 3 on the rotor 1 is adapted for winding a continuous fiber as a scanning device axially scans the periphery of the rotor. The rotor 1 and the rotor mounts carried on the yoke 50 are removable. The bearings 4 and 5 carried on the yoke 50 are supported on the frame 6 and aligned by the round pin 51 and diamond pin 52. The bearing 5 consists of the upper half 7 and the lower half 8. These two halves are bolted together by the plurality of bolts 9 and dowels 10. The top half carries a single insert 11 biased by the spring 12 compressed between the insert 11 and the plug 13. The insert 11 biases the shaft 2 toward the inserts 14 and 15 to reduce vibrations. If the rotor is relatively heavy and balanced accurately, gravity alone is sufficient to retain the shaft seated on the inserts 14 and 15.

The end of the shaft 2 is formed with two axial slots 16 which receive the keys 17 in sleeve 18. The keys 17 slide in the slots 20 of the driving shaft 21 of the prime mover. The keys 17 are preferably made of a resilient material such as nylon which can absorb shock in stopping and starting of the rotor 1. The phantom view illustrates the engaged position while the section view illustrates the disengaged position.

The rotor 1 is biased to a position as illustrated in FIG. 1 by a permanent magnet 22 which is connected to a pole piece 23. The pole piece 23 connects the magnet 22 with the annulus 24. The annulus 24 has a plurality of axial holes 25 which receive the screws 26. Intermediate the annulus 24 and the casting 27 supporting the screws are positioned a plurality of spring washers such as Belleville springs which bias the annulus 24 away from the casting 27. As the screws are screwed into the casting 27 the ring carrying the pole piece 23 and the magnet 22 is moved axially relative to the casting 27 on the rotor. The screws are primarily intended to align the annulus 24, sleeve 23, and magnet 22 with the rotor axis, but they also vary the length of the air gap 29 although care must be used to retain a uniform length of air gap for 360°.

The adjustment of the air gap 29 intermediate the clearance ring 30 and the magnet 22 is controlled by the clearance ring. By controlling the air gap 29 the axial force biasing the rotor against the thrust bearing is controlled. This axial thrust is regulated to give sufficient force to eliminate end play and maintain a force to overcome vibration of the rotor axially relative to the rotor bearings 4 and 5.

Referring to the right hand end of the rotor shaft 2 a thrust bearing is constructed and arranged to establish a predetermined axial relationship of the rotor 1 relative to the yoke 50. The bearing 4 includes a lower half 31 and an upper half 32. A double insert arrangement is provided in the lower half and a spring biased insert 33 engages the shaft from the upper half 33 of the bearing 4. The upper insert is optional depending on rotor balance and rotor weights.

The magnetic circuit biases the shaft 2 in the right hand direction causing the thrust ball 34 of the thrust bearing 35 to engage the shoe 36. The shoe 36 is received within a shoe cage 37 and positioned by the base cup 38. The base cup 38 threadedly engages the outer periphery of the sleeve 39 which contains the thrust bearing assembly.

The base cup 38 threadedly engages on its outer periphery the collar 40 which can be tightened to lock the base cup 38 relative to the sleeve 39. This provides a thrust bearing which is adjustable axially. With a predetermined given axial dimension of interchangeable rotors relative to the yoke the axial dimension of any replacement rotor remains constant with a given thrust bearing setting. All yokes are identical and are positioned on the pins 51 and 52 in the same manner. If for any reason a change in this dimension is required an adjustment may be provided by the thrust bearing 35. If a change in the force operating on the thurst bearing is desired then the change in the air gap 29 of the magnetic circuit 41 will provide this adjustment.

The operation of the device will be described in the following paragraphs. The yoke 50 supports the bearings 4 and 5 and provides a fixed base for the bearings 4 and 5. The yoke is formed with two holes on its lower portion one of which receives the round pin 51 and the other which receives the diamond pin 52. In other words the pin 51 gives a four way alignment and pin 52 gives a two way alignment. This establishes a fixed relationship between the frame 6 and the yoke 50. The frame 6 is adapted for supporting a scanning means (not shown) which would ordinarily have a fixed starting position relative to the frame 6. The yoke 50 is readily removable from the pins 51 and 52 as it seats on these pins by gravitational force or clamping means. The rotor spins true about its axis and produces substantially no vibrations. With a predetermined dimension of a rotor relative to the frame this dimension can be held on all rotors which are interchangeable on the frame.

There is however, an adjustment provided in event a dimension need be changed or returned to the predetermined dimension originally established. This may be achieved through rotation of the base cup 38 which carries the shoe cage 37 and the shoe 36 engaging the thrust ball 34. This provides axial movement of the shaft 2 and the rotor 1 depending on the rotation of the base cup 38 realtive to the sleeve 39. Once this dimension is set it is locked by the collar 40 against the base cup 38 and sleeve 39.

The axial thrust on the thrust bearing 35 is also adjustable to compensate for changes of the dimensions in the thrust bearings 35. The initial setting of the magnetic circuit 41 is controlled by adjustments of the screws 26, which carry the annulus 24, the pole piece 23 and the magnet 22. These are primarily intended to provide initial alignment of the magnetic circuit relative to the rotor. The clearance ring 30 provides adjustment of the air gap 29 as it is rotated relative to the supporting base on bearing 4. The axial thrust is controlled through the air gap, in other words the greater the air gap the less the force and vice versa.

Accordingly the rotor is removable as a unit and is provided with individual adjustment of axial dimensions of the rotor relative to the frame as well as the axial thrust created by a magnetic circuit.

A further feature is a provision of nylon keys 17 which may be slid axially from the slots 16 of shaft 2 to remove the rotor as illustrated in FIG. 3. The nylon keys 17 also provide a cushion for shock during the initial starting and stopping of the rotor.

The preferred embodiment of this invention has been illustrated and described. It is understood that other devices might be devised which would fall within the scope of the invention which is defined by the attached claims.

I claim:

1. A rotor and bearing assembly comprising a rotor assembly having a shaft, a frame, a yoke aligned with said frame including bearings supporting said shaft, a thrust bearing fixed relative to said yoke having an axial adjusting means controlling the axial position of the rotor relative to the yoke, means providing a magnetic circuit in said rotor and a sleeve fixed relative to said yoke biasing said rotor to contact said thrust bearing, said rotor and said sleeve defining an air gap, and means adjustably controlling the air gap length to control the axial force on said thrust bearing and thereby provide a predetermined rotor position relative to said yoke.

2. A rotor and bearing assembly comprising in combination, a frame having alignment pins, a rotor having a shaft, a yoke having holes for receiving said alignment pins, a bearing means on said yoke rotatably and slidably supporting said shaft, an adjustable thrust bearing on said bearing means engaging an end of said shaft adjustably controlling the relative axial position of said rotor relative to said bearing means, a magnetic circuit constructed and arranged in said bearing means and said rotor including means varying the air gap in said magnetic circuit to thereby control the axial thrust of said shaft on said thrust bearing thereby controlling the rotor position axially relative to said bearing means.

3. A rotor and bearing assembly comprising, a rotor having a shaft, a rotor bearing means supporting the shaft constructed and arranged to permit axial movement of said rotor relative to said bearing means, and adjustable thrust bearing on said bearing means engaging the end surface of said shaft controlling the axial position of said rotor relative to said bearing means, a magnetic circuit formed by said rotor and said rotor bearing means including a permanent magnet and adjusting means constructed and arranged for varying the air gap in said circuit and thereby the thrust on said thrust bearing to maintain a predetermined thrust and running position of said rotor relative to said bearing means.

4. A fiber winding unit having an interchangeable rotor having a predetermined alignment means comprising a rotor having a shaft, a yoke carrying a bearing means rotatably and slidably supporting the shaft of said rotor, alignment means mounting in a predetermined alignment on the frame of said winding unit for aligning said yoke on said frame, an adjustable thrust bearing on said bearing means engaging the end surface of said shaft controlling the axial position of said rotor relative to the yoke, a magnetic circuit in said rotor and said rotor bearing means constructed and arranged to define an air gap intermediate said rotor and said rotor bearing, means in said magnetic circuit adjusting the length of said air gap and thereby controlling the axial force created on said thrust bearing for eliminating and play and vibration and maintaining a predetermined control dimension of said rotor relative to said yoke to permit interchangeability of said rotors on said frame.

5. A fiber winding unit having an interchangeable rotor and a predetermined alignment means comprising, a shaft supporting a fiber winding rotor, a frame, a yoke carrying a rotor bearing means rotatably and slidably supporting said shaft, alignment means removably aligning said yoke on said frame, an adjustable thrust bearing positioned on said rotor bearing means and engaging an end surface of said shaft to control the axial position of said rotor relative to said yoke, a magnetic circuit formed in said rotor and said rotor bearing means constructed and arranged to define an air gap intermediate said rotor and said rotor bearing means, a clearance ring controlling the air gap in said magnetic circuit and thereby the axial force maintaining contact between said shaft and said thrust bearing, said unit thereby having means for establishing a predetermined dimensional relationship between the frame of said winding unit and said rotor and eliminating axial vibration by controlling the axial force to thereby control the winding of a fiber on the periphery of said drum.

References Cited by the Examiner

UNITED STATES PATENTS

| 1,239,057 | 9/1917 | Sparks | 308—166 |
| 2,609,253 | 9/1952 | Brown | 308—166 |

FOREIGN PATENTS 322,995  12/1929  Great Britain.

DON A. WAITE, *Primary Examiner.*

FRANK SUSKO, *Examiner.*